United States Patent [19]

Ejima et al.

[11] Patent Number: 5,070,405

[45] Date of Patent: Dec. 3, 1991

[54] ELECTRONIC STILL CAMERA WITH MULTI-AREA LIGHT METERING AND GRAY SCALE MODIFICATION

[75] Inventors: Satoshi Ejima, Tokyo; Masahiro Suzuki, Yokohama, both of Japan

[73] Assignee: Nikon Corporation, Tokyo, Japan

[21] Appl. No.: 581,879

[22] Filed: Sep. 13, 1990

[30] Foreign Application Priority Data

Sep. 19, 1989 [JP] Japan .................................. 1-242507
Sep. 19, 1989 [JP] Japan .................................. 1-242508

[51] Int. Cl.$^5$ ............................................. H04N 5/30
[52] U.S. Cl. .................................... 358/209; 358/909; 358/164
[58] Field of Search ................. 358/209, 909, 219, 32, 358/164

[56] References Cited

U.S. PATENT DOCUMENTS 4,489,349 12/1984 Okada ................................. 358/168
4,670,788 6/1987 Ozaki ................................. 358/164
4,686,562 8/1987 Yamanaka ........................... 358/32
4,918,519 4/1990 Suzuki et al. ....................... 358/29

Primary Examiner—James J. Groody
Assistant Examiner—Tuan V. Ho
Attorney, Agent, or Firm—Shapiro and Shapiro

[57] ABSTRACT

An electronic still camera for recording stationary images comprises a light metering device for light-metering a plurality of portions of an object to be photographed and outputting a pluraltiy of signals corresponding to the quantities of light of the portions, an image pickup device for converting the image of the object to be photographed into an image signal, a contour enhancing device provided with a plurality of selectable contour enhancement degrees and enhancing the contour of the image signal, and a selecting device for effecting calculation on the basis of the outputs from the light metering device and selecting one of the plurality of contour enhancement degrees provided in the contour enhancing device on the basis of the result of the calculation.

2 Claims, 7 Drawing Sheets

ELECTRONIC STILL CAMERA WITH MULTI-AREA LIGHT METERING AND GRAY SCALE MODIFICATION

BACKGROUND OF THE INVENTION

1. Field of the Invention

This invention relates to an electronic still camera for recording stationary images.

2. Related Background Art

FIG. 1 of the accompanying drawings is a block diagram showing the construction of an electronic still camera according to the prior art using a contour enhancement circuit.

In FIG. 1, an object to be photographed, not shown, has its quantity of light adjusted by a stop member 2 and is imaged on the image pickup surface of an image pickup element 3 by an optical lens 1, and the light signal of the image is converted into an electrical signal. The image pickup element 3 comprises various solid state image pickup elements such as a CCD (charge coupled device), an MOS device and an SIT. The output of the image pickup element 3 is connected to a sample hold circuit 5. A drive pulse generator 4 generates a pulse for driving the image pickup element 3 to the image pickup element 3, and generates a sample pulse for sampling and holding to the sample hold circuit 5. The sample hold circuit 5 samples and holds the output signal from the image pickup element 3 at the timing of the sampling pulse from the drive pulse generator 4, and outputs an analog image signal to an amplifier circuit 6. The image signal amplified by the amplifier circuit 6 is then input to a contour enhancement circuit 7, in which the process of enhancing the change of the image signal is carried out. The output signal of the contour enhancement circuit 7 is input to a level adjustment circuit 8 for adjusting the white clip level and the set up level, and the output signal of the level adjustment circuit 8 is input to a recording portion 9.

The reference numeral 13 designates a light metering element for metering the quantity of light of the object to be photographed before photographing. The light metering element 13 is designed such that the image of the object to be photographed is formed thereon by a condensing lens 12. The image formed on the light metering element 13 is converted into an electrical signal by the photoelectric converting function of the light metering element 13 and is output to an amplifier 15. The electrical signal amplified by the amplifier 15 and logarithmically compressed is converted into a digital signal by an A/D converter 16 and is input to a central calculation processing portion 10. Also, a stroboscopic lamp 11 which is a light emitting device is provided to momentarily illuminate the object to be photographed when it is dark.

A release button 18 is a switch for the user to make the camera ready to photograph, and is operatively associated with contacts 17a, 17b and 17c. The contacts 17a, 17b and 17c are connected to the central calculation processing portion 10. When the release button 18 is depressed lightly, the contacts 17a and 17b are closed and the central calculation processing portion 10 performs a photographing preparation operation such as light metering. When the release button 18 is further depressed and the contacts 17b and 17c are closed, the central calculation processing portion 10 performs photographing operations such as the charge accumulation of the image pickup element 3 and the recording of the image signal.

The central calculation processing portion 10 connected to the recording portion 9 and the drive pulse generator 4 controls the operation of the present apparatus, determines the size of the aperture diameter of the stop member 2 and the charge accumulation time in the image pickup element 3 from the output signal of the light metering element 13 converted by the amplifier 15 and the A/D converter 16, controls the light emission of the stroboscopic lamp 11, controls the generation of pulse to the drive pulse generator 4, and causes the recording portion 9 to record the output signal from the level adjustment circuit 8.

In the above-described construction, when in photographing, the release button 18 is depressed lightly by the user and the contacts 17a and 17b are closed, the quantity of light of the object to be photographed, not shown, is metered by the light metering element 13, and the size of the aperture diameter of the stop member 2 and the charge accumulation time in the image pickup element 3 are determined. When the central calculation processing portion 10 judges that the object to be photographed is dark and sufficient exposure will not be obtained, the preparation for the light emission of the stroboscopic lamp 11 is effected. When the release button is then depressed deeply, the contacts 17b and 17c are closed, and the light from the object to be photographed, not shown, enters the image pickup element 3 through the optical lens 1 and the stop member 2, and as previously described, the image signal provided by the image pickup element 3 and the sample hold circuit 5 is input to the amplifier circuit 6. The image signal is electrically amplified in conformity with the predetermined amplification degree of the amplifier circuit 6 and subsequently, has its white clip level and set up level adjusted by the level adjustment circuit 8, and is recorded by the recording portion 9.

The prior art as described above has suffered from the following problems.

When in general photographing, the difference in quantity of light between the light portion and the dark portion of an object to be photographed is small, for example, as in a scene during cloudy weather, if contour enhancement is done at the standard contour enhancement degree in the contour enhancement circuit, the contrast of the image will be too weak and modulation will become null and therefore, a visually good image will not be obtained. Also, when the difference in quantity of light between the light portion and the dark portion of an object to be photographed is great, such as when a figure is photographed during fine weather or when a stroboscopic lamp is used, if contour enhancement is done at the standard contour enhancement degree in the contour enhancement circuit, the contrast of the image will be too strong and modulation will become too strong and again, a visually good image will not be obtained.

As described above, in the prior art, the setting of the contour enhancement degree is fixed in the contour enhancement circuit and contour enhancement is done always at the same enhancement degree, and this has led to the problem that contour enhancement matching an object to be photographed is not done and depending on the situation of the object to be photographed, a visually good image of good contrast is not always obtained.

FIG. 2 of the accompanying drawings is a block diagram showing the construction of an electronic still camera according to the prior art using a gray scale modification circuit.

In FIG. 2, optical members and circuits given reference numerals identical to those in FIG. 1 are identical to those in FIG. 1 and therefore need not be described.

The output signal of the contour enhancement circuit 7 is input to a gray scale modification circuit 19, in which gamma correction is effected so that the image may assume the standard gray scale. The output signal of the gray scale modification circuit 19 is input to the level adjustment circuit 8 for adjusting the white clip level and the set up level, and the output signal of the level adjustment circuit 8 is input to the recording portion 9.

The image signal is electrically amplified in conformity with the predetermined amplification degree of the amplifier circuit 6, and has predetermined contour enhancement applied thereto by the contour enhancement circuit 7. Subsequently, modification of the gray scale is effected by gamma correction at the standard γ value preset in the gray scale modification circuit 19, and then the image signal has its white clip level and set up level adjusted by the level adjustment circuit 8 and is recorded in the recording portion 9.

The prior art as described above has suffered from the following problems.

When in general photographing, the difference in quantity of light between the light portion and the dark portion of an object to be photographed is small, for example, as in a scene during cloudy weather, if gray scale modification by gamma correction at the standard γ value is effected in the gray scale modification circuit, the contrast will be weak and therefore, a visually good image will not be obtained. Also, when the difference in quantity of light between the light portion and the dark portion of an object to be photographed is great, such as when a figure is photographed during fine weather or when a stroboscopic lamp is used, if gray scale modification by gamma correction at the standard γ value is effected in the gray scale modification circuit, the contrast will be strong and therefore, a visually good image will not be obtained.

As described above, in the prior art, gray scale modification by gamma correction always at the standard γ value is effected in the gray scale modification circuit and therefore, the gray scale modification characteristic is fixed and gray scale modification matching the object to be photographed is not done, and this has lead to the problem that depending on the situation of the object to be photographed, a visually good image cannot always be obtained.

SUMMARY OF THE INVENTION

The present invention has been made in view of such problems peculiar to the prior art and an object thereof is to provide an electronic still camera which can always obtain a visually good image of good contrast irrespective of the distribution of the light portion and the dark portion of an object to be photographed in the photographing picture plane.

To achieve the above object, the electronic still camera of the present invention has light metering means for light-metering a plurality of portions of an object to be photographed in the photographing picture plane and outputting a plurality of signals corresponding to the quantities of light of said portions, image pickup means for converting the image of the object to be photographed into an image signal, contour enhancing means provided with a plurality of selectable contour enhancement degrees and enhancing the contour of the image signal, and selecting means for selecting one of said plurality of contour enhancement degrees of said contour enhancing means, and effects calculation in said selecting means on the basis of the outputs of said light metering means and selects one of said plurality of contour enhancement degrees on the basis of the result of the calculation. The electronic still camera also has light emitting means for illuminating the object to be photographed, and selects one of said plurality of contour enhancement degrees in conformity also with the presence or absence of the light emission by said light emitting means.

By the construction as described above, when the difference in quantity of light between said portions of the object to be photographed in the photographing picture plane is great, the contour enhancement degree can be made weak during the contour enhancement of the image signal by said contour enhancing means, and when the difference in quantity of light between said portions of the object to be photographed is small, the contour enhancement degree can be made strong and therefore, an image of good contrast can always be obtained from any object to be photographed. Also, when the object to be photographed is dark and is illuminated by said light emitting means, the difference in quantity of light between said portions of the object to be photographed becomes great and therefore, the contour enhancement degree can be made weak during the contour enhancement of the image signal by said contour enhancing means.

It is also an object of the present invention to provide an electronic still camera which can always obtain a visually good image irrespective of the situation of an object to be photographed.

To achieve the above object, the electronic still camera of the present invention has light metering means for light-metering a plurality of portions of an object to be photographed in the photographing picture plane and outputting a plurality of signals corresponding to the quantities of light of said portions, image pickup means for converting the image of the object to be photographed into an image signal, gray scale modification means provided with a plurality of selectable gray scale modification characteristics and modifying the gray scale of the image signal, and selecting means for selecting one of said plurality of gray scale modification characteristics of said gray scale modification means, and effects calculation in said selecting means on the basis of the outputs of said light metering means, and selects one of said plurality of gray scale modification characteristics on the basis of the result of the calculation. The electronic still camera also has light emitting means for illuminating the object to be photographed, and selects one of said plurality of gray scale modification characteristics by said selecting means in conformity also with the presence or absence of the light emission by said light emitting means.

By the construction as described above, when the difference in quantity of light between said portions of the object to be photographed in the photographing picture plane is great, the gray scale is modified so as to weaken the contrast during the gray scale modification of the image signal by said gray scale modification means, and when the difference in quantity of light is small, the gray scale is modified so as to strengthen the contrast, whereby an image of good contrast can be obtained from any object to be photographed. Also, when the object to be photographed is illuminated by said light emitting means, the difference in quantity of light between said portions of the object to be photographed becomes great and therefore, the gray scale is modified so as to weaken the contrast during the gray scale modification of the image signal by said gray scale modification means, whereby an image of good contrast can always be obtained.

DESCRIPTION OF THE PREFERRED EMBODIMENTS

An embodiment of the present invention will hereinafter be described with reference to FIG. 3.

Figure 1:
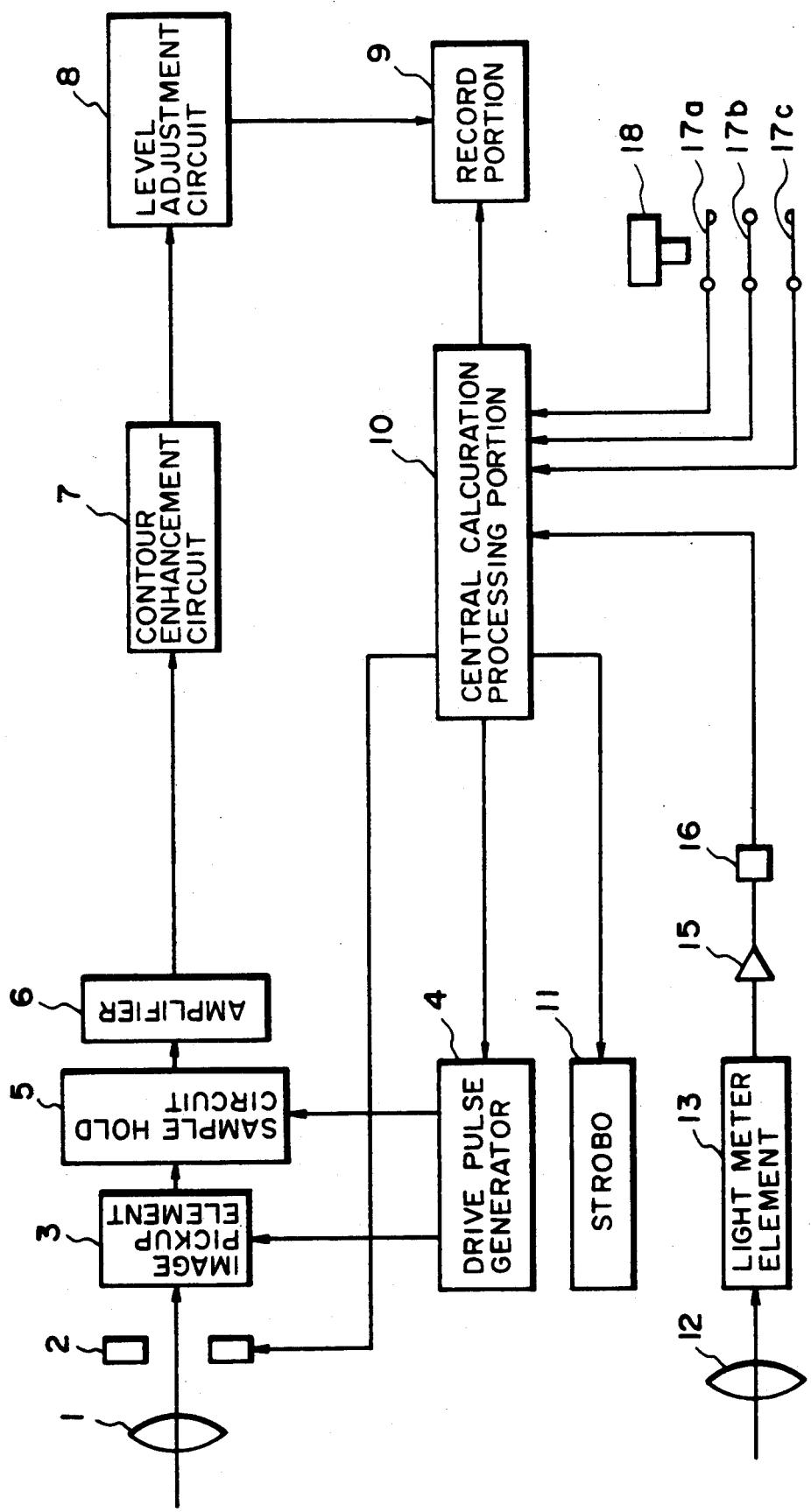
FIG. 1 is a block diagram showing the construction of an electronic still camera according to the prior art using a contour enhancement circuit.
Figure 3:
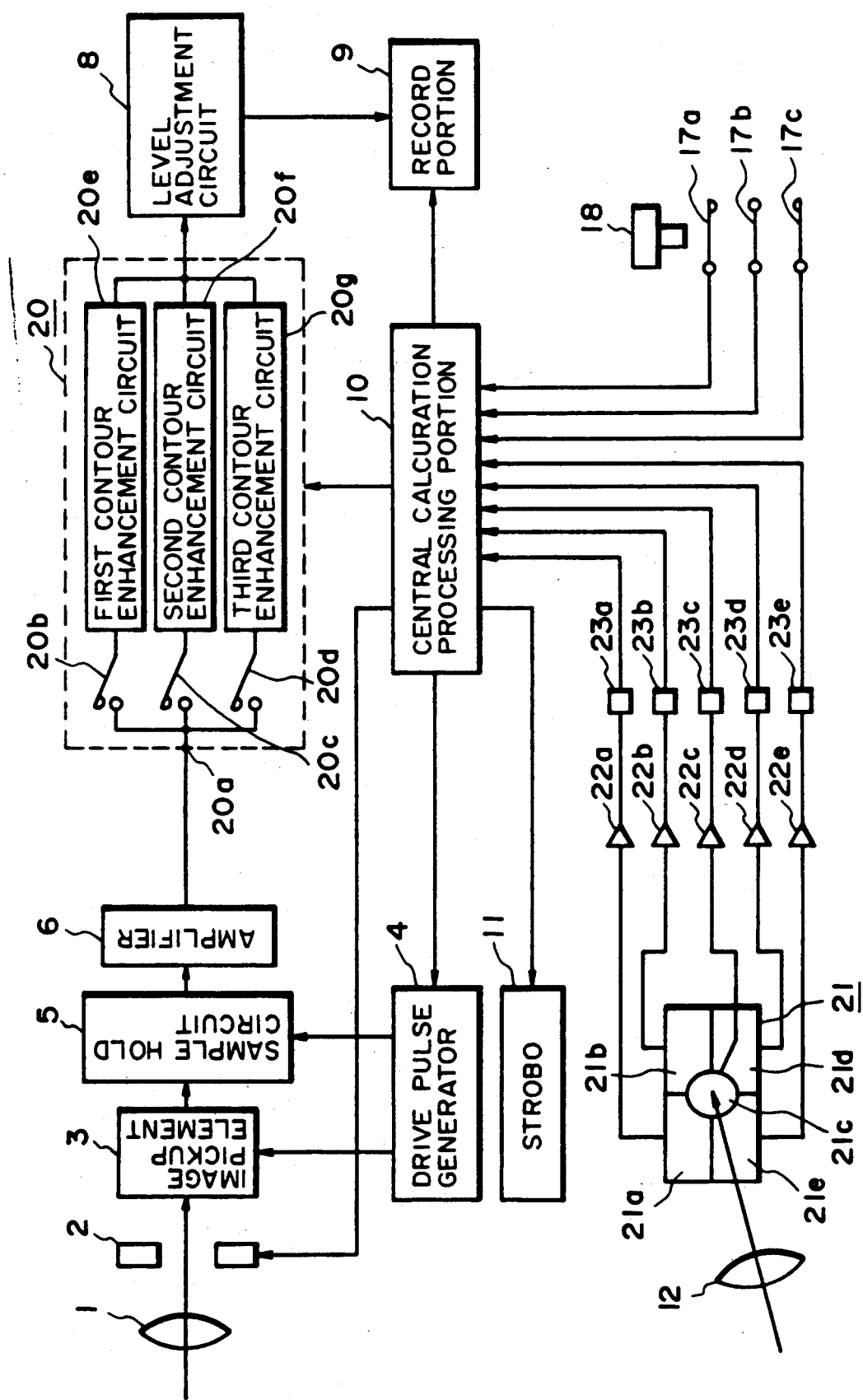
FIG. 3 is a block diagram showing the construction of an electronic still camera according to a first embodiment of the present invention.

FIG. 3 is a block diagram showing the construction of an electronic still camera according to a first embodiment of the present invention. In FIG. 3, optical members and circuits given reference numerals identical to those in FIG. 1 are identical to those in FIG. 1 and therefore need not be described.

In FIG. 3, the output terminal 20a of the amplifier circuit 6 is parallel-connected with switches 20b-20d. These switches 20b-20d are connected to respective contour enhancement circuits 20e-20g. In the contour enhancement circuits 20e-20g, the respective contour enhancement degrees are set so as to be one time, two times and four times. The first to third switches 20b-20d and the first to third contour enhancement circuits 20e-20g together constitute a contour enhancement circuit 20, and the first to third switches 20b-20d are controlled by the central calculation processing portion 10 so that any contour enhancement degree may be selected.

The image of an object to be photographed is formed on a light metering member 21 through the condensing lens 12. The light metering member 21 is comprised of five light metering elements 21a-21e to light-meter the object to be photographed in five divisions. The outputs of the light metering elements are amplified by amplifiers 22a-22e and logarithmically compressed, and are converted into digital signals by A/D converters 23a-23e and input to the central calculation processing portion 10.

Description of the operation of the electronic still camera constructed as described above will first be made with respect to a case where the difference in quantity of light between portions of the object to be photographed is great.

When the release switch 18 is depressed lightly by the user and the contacts 17a and 17b are closed, the central calculation processing portion 10 examines the output values of the light metering elements 21a-21e converted through the amplifiers 22a-22e and the A/D converters 23a-23e, and when the difference between the greatest output and the smallest output among them, i.e., the difference in quantity of light, is greater than the maximum value prestored in the central calculation processing portion 10, it is judged that the difference in quantity of light of the object to be photographed is great, and the switch 20b is closed and the other switches 20c and 20d are opened so that the contour enhancing process may be carried out by the first contour enhancement circuit 20e of the smallest contour enhancement degree.

Also, the central calculation processing portion 10 examines the outputs of the light metering elements 21a-21e converted through the amplifiers 22a-22e and the A/D converters 23a-23e, and determines the size of the aperture diameter of the stop member 2 and the charge accumulation time of the image pickup element 3 so that proper charge accumulation in the image pickup element 3 may be effected.

When the release button 18 is then depressed deeply and the contacts 17b and 17c are closed, the photographing operation is entered. Thereupon, the light passed through the optical lens 1 passes through the stop member 2 which has assumed a predetermined aperture diameter and is imaged on the image pickup element 3. Charge accumulation in the image pickup element 3 is effected for the charge accumulation time determined in the central calculation processing portion 10. The charge accumulated in the image pickup element 3 is subjected to predetermined amplification as an image signal by the amplifier circuit 6 via the sample hold circuit 5. The image signal then passes through the switch 20b and is subjected to the weakest contour enhancement by the first contour enhancement circuit 20e. Thereby, contour enhancement is done weakly for an object to be photographed having a great difference in quantity of light, i.e., so-called high contrast, and therefore, it never happens that the image becomes unnatural. The output signal is subjected to the adjustment of the white clip level and set up level in the white clip level and set up level adjustment circuit 8, and is recorded on a recording medium in the recording portion 9.

Description will now be made of the operation when the difference in quantity of light between portions of the object to be photographed is of a medium degree.

When the release switch 18 is depressed by the user and the contacts 17a and 17b are closed, the central calculation processing portion 10 examines the output values of the light metering elements 21a-21e converted through the amplifiers 22a-22e and the A/D converters 23a-23e. If the difference between the greatest output and the smallest output among them is between the maximum value and the minimum value prestored in the central calculation processing portion 10, it is judged that the difference in quantity of light between the portions of the object to be photographed is of a medium degree, and the switch 20c is closed and the other switches 20b and 20d are opened so that the contour enhancing process may be carried out in the second contour enhancement circuit 20f of a medium contour enhancement degree. The operation until the image signal is thereafter recorded in the recording portion 9 is as previously described.

If the difference in quantity of light is small, the operation is likewise as follows. The central calculation processing portion 10 examines the output values of the light metering elements 21a–21e converted through the amplifiers 22a–22e and the A/D converters 23a–23e, and if the difference between the greatest output and the smallest output among them is smaller than the minimum value prestored in the central calculation processing portion 10, it is judged that the difference in quantity of light between the portions of the object to be photographed is small, and the switch 20d is closed and the other switches 20b and 20c are opened so that the contour enhancing process may be carried out in the third contour enhancement circuit 20g of the strongest contour enhancement degree. The operation until the image signal is thereafter recorded in the recording portion 9 is as previously described.

Thus, in the case of an object to be photographed having a small difference in quantity of light, the strongest contour enhancement is effected so that modulation may be visually provided. When the difference in quantity of light is of a medium degree, a medium degree of contour enhancement is effected within a range which is not unnatural.

Description will now be made of a case where the object to be photographed is dark and the stroboscopic lamp 11 is used.

When the release button 18 is depressed and the contacts 17a and 17b are closed, the central calculation processing portion 10 examines the outputs of the light metering elements 21a–21e converted through the amplifiers 22a–22e and the A/D converters 23a–23e, and if it is judged that the outputs are small, that is, the object to be photographed is dark and proper exposure cannot be accomplished unless the stroboscopic lamp 11 is made to emit light, the preparation for the light emission of the stroboscopic lamp, for example, the charging of a capacitor, not shown, is effected. When the release button 18 is depressed deeply and the contacts 17b and 17c are closed, the photographing operation is performed. In this case, the light emission of the stroboscopic lamp 11 is effected during the charge accumulation in the image pickup element 3. At this time, the central calculation processing portion 10 closes the switch 20b and opens the other switches 20c and 20d so that the contour enhancing process may be carried out in the first contour enhancing circuit 20e of the smallest contour enhancement degree, at the stage whereat the central calculation processing portion 10 has examined the outputs of the light metering elements 21a–21e converted through the amplifiers 22a–22e and the A/D converters 23a–23e. This is because if photographing is effected by the use of the stroboscopic lamp 11 approximate to a point source of light, the contrast of the object to be photographed and the shadow formed in the background of the object to be photographed will be strong and an image having a great difference in quantity of light will be recorded and so, it will provide a visually good image to make the contour enhancement weakest. The sequence thereafter is as previously described.

The case of the light emission of the stroboscopic lamp has been described with respect to a case where the outputs of all the light metering elements 21a–21e are small, but even when only the output of one of the light metering elements 21a–21e, for example, the light metering element 21c which is the light metering element for light-metering the central portion, is small and it is judged that photographing will be effected in a backlight condition, a visually good image can be photographed without the central object to be photographed becoming dark if the stroboscopic lamp 11 is made to emit light to the central object to be photographed. In such case, by the stroboscopic lamp 11 being made to emit light, the difference in quantity of light between the background and the main object to be photographed becomes relatively small and therefore, design is made such that the contour enhancement circuit 20f having a medium contour enhancement degree is selected.

Figure 4:
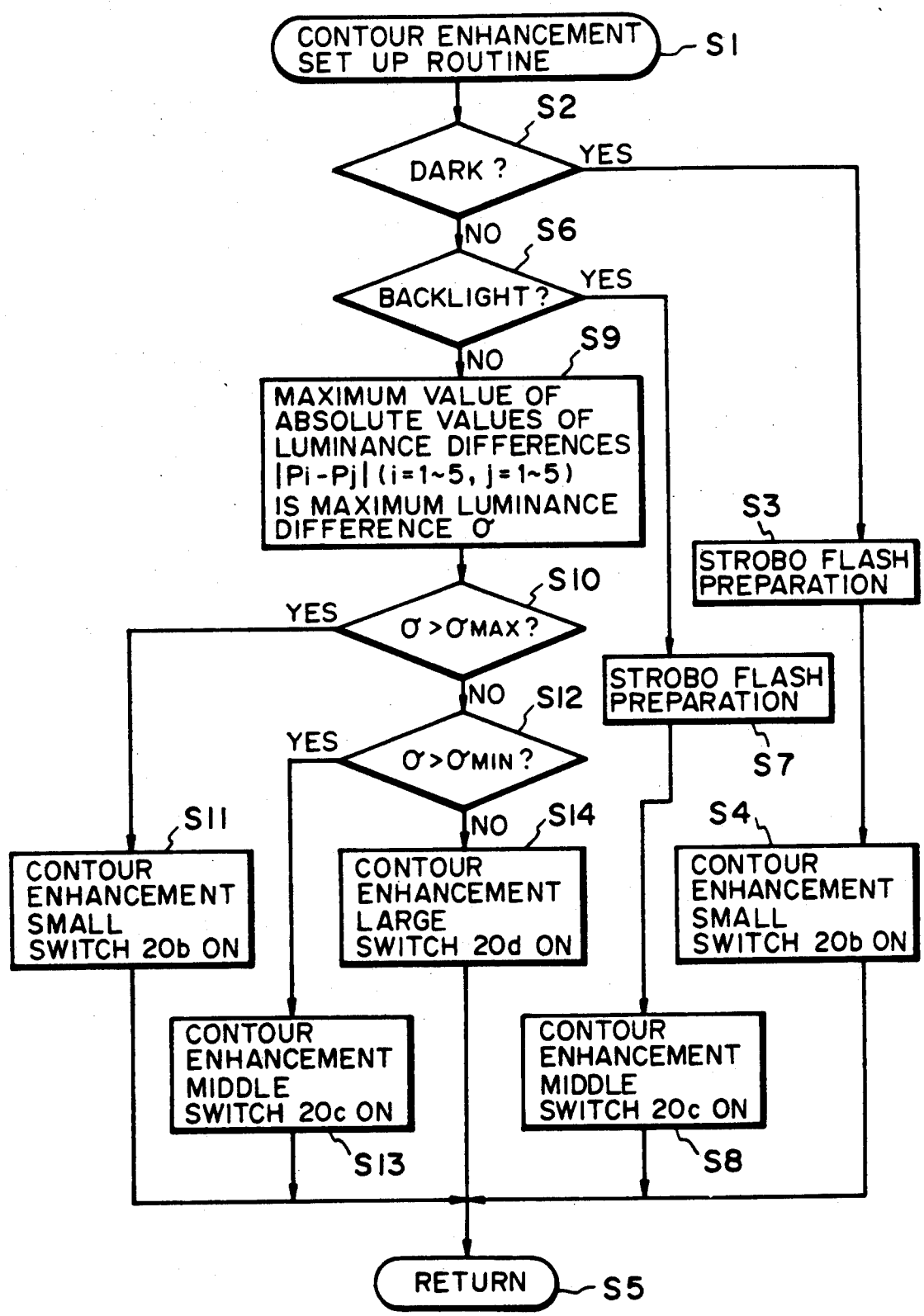
FIG. 4 is a flow chart showing the contour enhancement degree selecting operation based on the result of multimetering in the first embodiment of the present invention.

The setting of the contour enhancement degree by the aforedescribed central calculation processing portion 10 will be now described with reference to the flow chart shown in FIG. 4. In FIG. 4, $P_1$–$P_5$ are the outputs of the A/D converters 22a–22e, respectively, $\sigma_{MAX}$ is the maximum allowable value of the luminance difference, and $\sigma_{MIN}$ is the minimum allowable value of the luminance difference.

When the release switch 18 is depressed lightly by the user and the contacts 17a and 17b are closed, the central calculation processing portion 10 starts the contour enhancement set up routine at a step 1 (S1).

At a step 2 (S2), whether the object field is dark is judged on the basis of whether the weighted mean value and the normal mean value of the outputs $P_1$–$P_5$ of the A/D converters 22a–22e are lower than a predetermined value. If the object field is dark, at a step 3 (S3), the light emission of the stroboscopic lamp is prepared, and at a step 4 (S4), the switch 20b is closed and the first contour enhancement circuit 20e which is small in the contour enhancement degree is selected, and at a step 5 (S5), return is made.

If at the step 2, it is judged that the object field is not dark, at a step 6 (S6), whether the light is backlight is judged. The judgement as to whether the light is backlight is done, for example, on the basis of whether the difference between the luminance of the central light metering area 21c and the average luminance of a plurality of marginal light metering areas 21a, 21b, 21d and 21e exceeds a predetermined value. If at the step 6 (S6), it is judged that the light is backlight, at a step 7 (S7), the light emission of the stroboscopic lamp is prepared, and at a step 8 (S8), the switch 20c is closed, and the second contour enhancement circuit 20f of a medium contour enhancement degree is selected and at a step 5 (S5), return is made.

If at the step 6, it is judged that the light is not backlight, at step 9 (S9), the maximum value of the absolute values of luminance differences $|P_i-P_j|$ (i=1–5, j=1–5) is defined as a maximum luminance difference $\sigma$. Subsequently, at a step 10 (S10), the maximum luminance difference $\sigma$ is compared with the maximum allowable value $\sigma_{MAX}$ of the luminance difference prestored in the central calculation processing portion 10, and if the maximum luminance difference $\sigma$ is greater than the maximum allowable value $\sigma_{MAX}$ of the luminance difference, at a step 11 (S11), the switch 20b is closed and the first contour enhancement circuit 20e of a small contour enhancement degree is selected, and at the step 5 (S5), return is made.

If at the step 10 (S10), the maximum luminance difference $\sigma$ is equal to or less than the maximum allowable value $\sigma_{MAX}$ of the luminance difference, at a step 12 (S12), the maximum luminance difference $\sigma$ is compared with the minimum allowable value $\sigma_{MIN}$ of the luminance difference prestored in the central calculation processing portion 10. If the maximum luminance difference $\sigma$ is greater than the minimum allowable value $\sigma_{MIN}$ of the luminance difference, at a step 13 (S13), the switch 20c is closed and the second contour enhancement circuit 20f of a medium contour enhancement degree is selected, and at the step 5 (S5), return is made.

If at the step 12 (S12), the maximum luminance difference $\sigma$ is equal to or less than the minimum allowable value $\sigma_{MIN}$ of the luminance difference, at a step 14 (S14), the switch 20d is closed and the third contour enhancement circuit 20g of a great contour enhancement degree is selected, and at the step 5 (S5), return is made.

In the present embodiment, a change-over system using switches is adopted so that the contour enhancement degree may be stepwisely changed, but alternatively, design may be made such that the contour enhancement degree is continuously changed. Also, as regards the use of the stroboscopic lamp, provision may be made of a selection switch for determining the presence or absence of light emission not only by the judgment of the central calculation processing portion, but also by the user's judgment, and design may be made such that the contour enhancement degree is changed over in response to this switch.

Also, in the present embodiment, selection of the contour enhancement degree is effected on the basis of the difference between the maximum value and the minimum value of the output values from the light metering means, whereas the method of calculation is not restricted thereto, but conversion tables corresponding to the output values from the light metering means may be memorized by the central calculation processing portion and selection of the contour enhancement degree may be effected on the basis of such conversion tables.

As described above, according to the first embodiment, a plurality of portions of an object to be photographed are light-metered by the light metering means and the contour enhancement degree is changed in conformity with the difference in quantity of light, whereby a good image visually free of unnaturalness of contrast can always be obtained from any object to be photographed. Also, even when the object to be photographed is illuminated by the light emitting means and the difference in quantity of light becomes great, a good image visually free of unnaturalness of contrast can be obtained by weakening the contour enhancement degree.

A second embodiment of the present invention will now be described with reference to FIG. 5.

Figure 2:
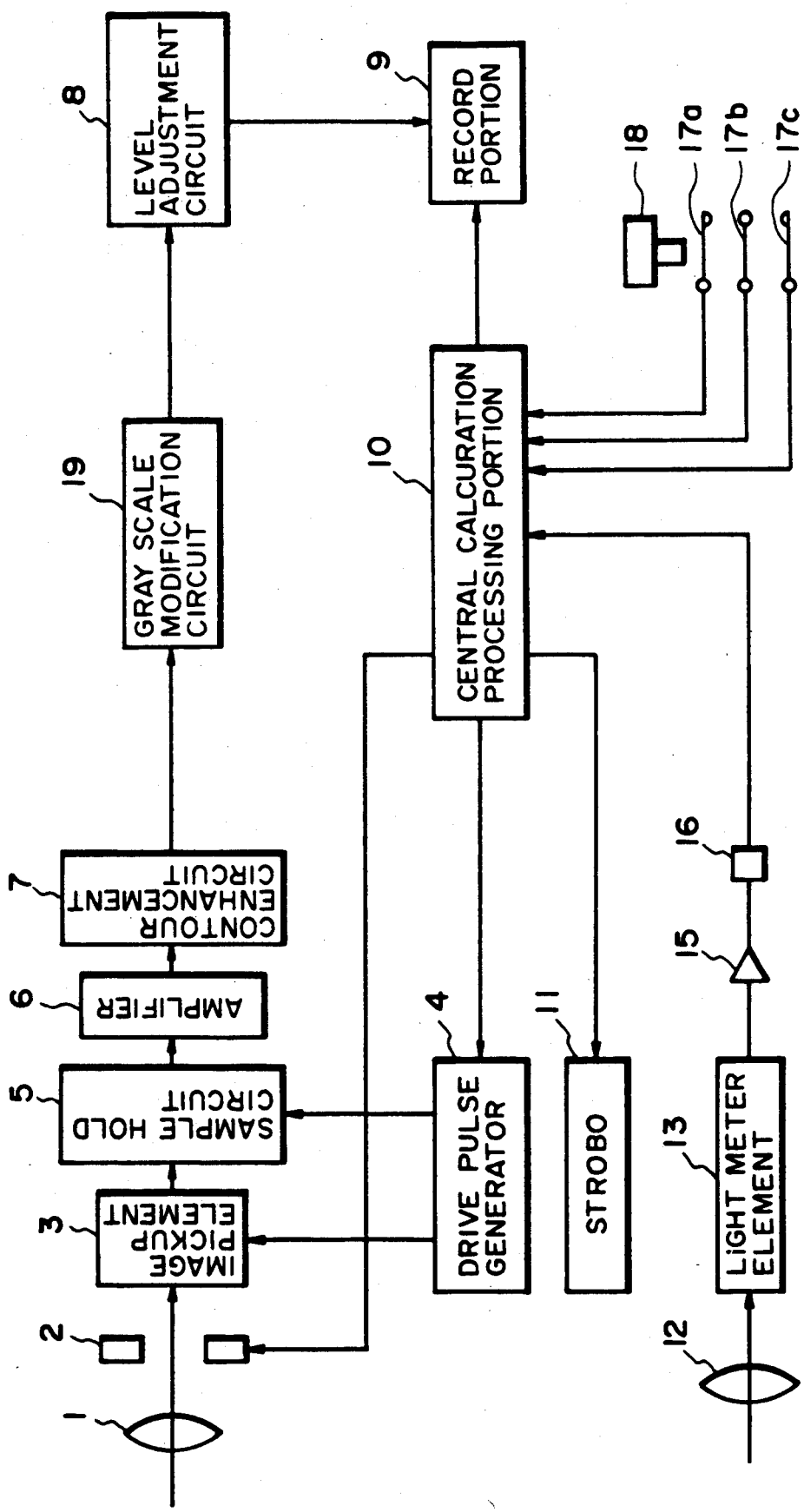
FIG. 2 is a block diagram showing the construction of an electronic still camera according to the prior art using a gray scale modification circuit.
Figure 5:
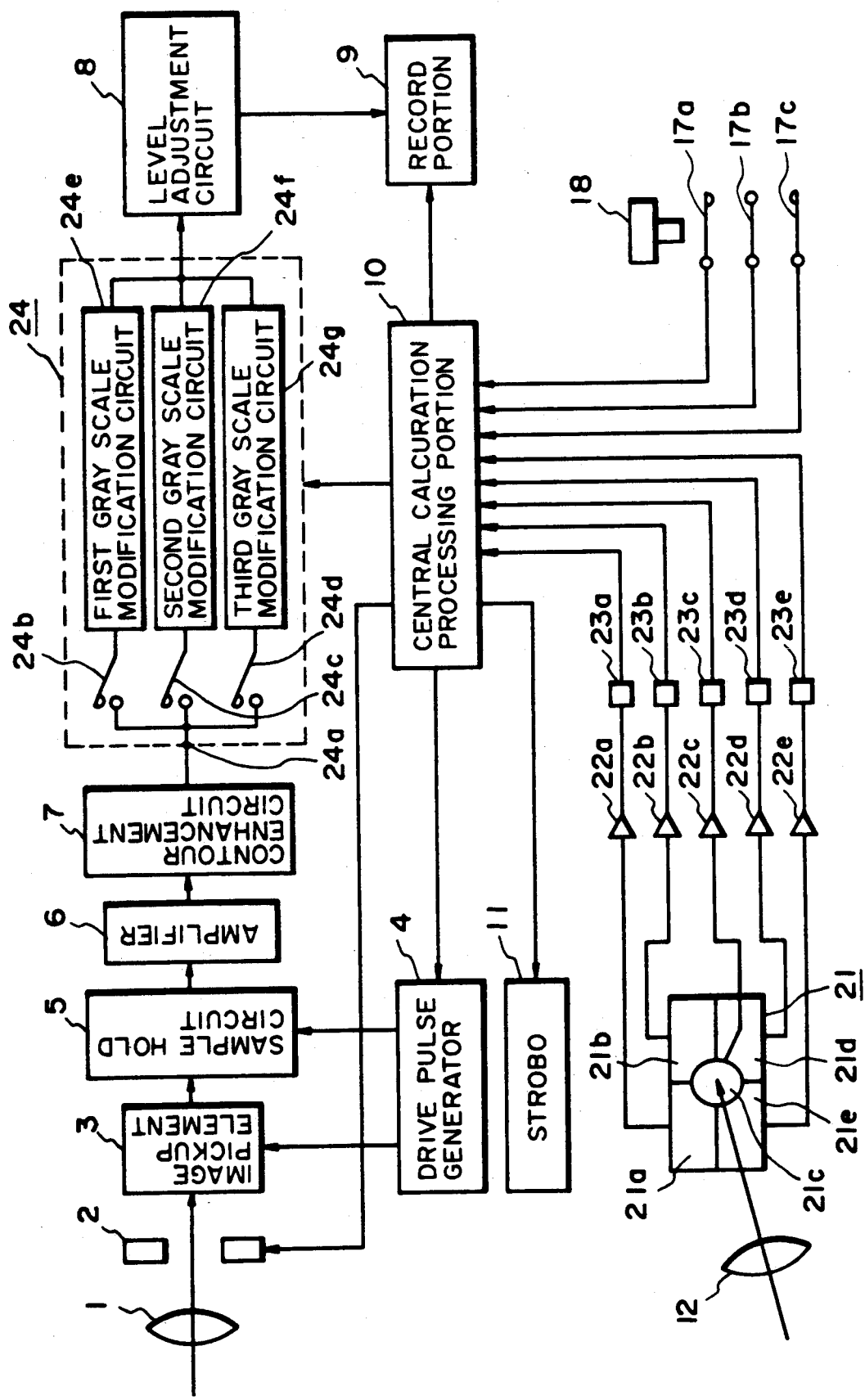
FIG. 5 is a block diagram showing the construction of an electronic still camera according to a second embodiment of the present invention.

FIG. 5 is a block diagram showing the construction of an electronic still camera according to the second embodiment of the present invention. In FIG. 5, optical members and circuits given the same reference numerals as those in FIG. 2 are the same as those in FIG. 2 and therefore need not be described.

In FIG. 5, the output terminal 24 of the contour enhancement circuit 7 is parallel-connected to three switches 24b-24d. These switches 24b-24d are connected to respective gray scale modification circuits 24e-24g. The gray scale modification circuits 24e-24g are set such that their respective gray scale modification characteristics are $\gamma 1$, $\gamma 2$ and $\gamma 3$ shown in FIG. 6.

Figure 6:
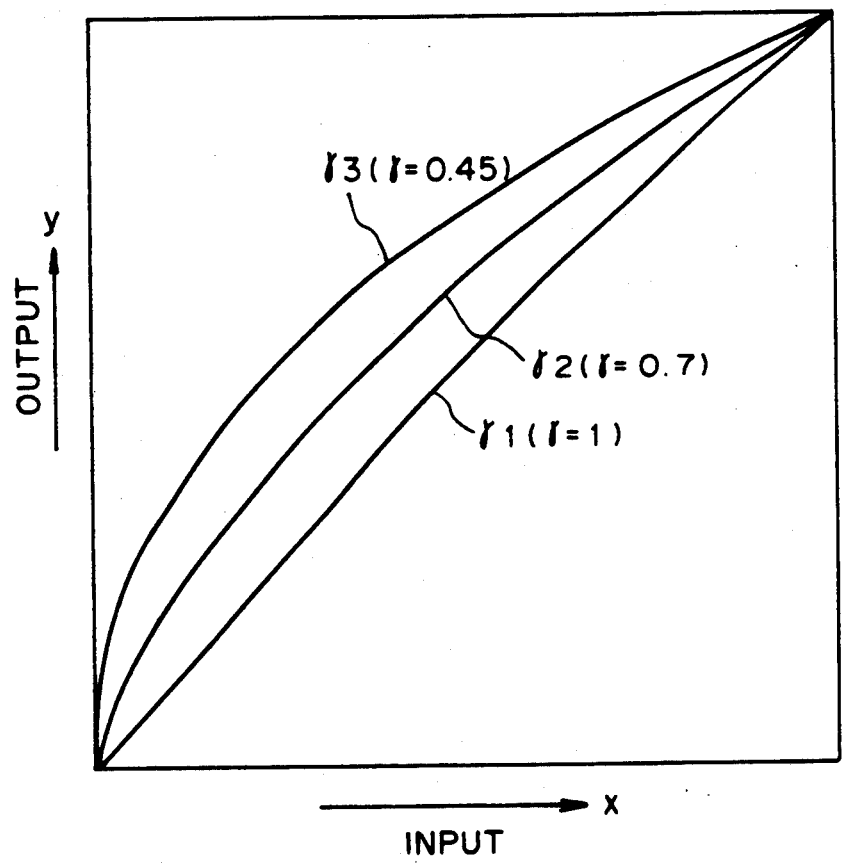
FIG. 6 is a graph showing the gray scale modification characteristics of the electronic still camera according to an embodiment of the present invention.

The gray scale modification characteristic of FIG. 6 represents the input and output characteristics of gamma correction, and is expressed as the following equation (1) when the input of the horizontal axis (the output of the contour enhancement circuit 7) is x and the output of the vertical axis (the output of the gray scale modification circuit 24) is y:

$$y = x^\gamma \tag{1}$$

Characteristic curves $\gamma 1$, $\gamma 2$ and $\gamma 3$ shown in FIG. 6 show the cases where in the equation (1), $\gamma = 1$, $\gamma = 0.7$ and $\gamma = 0.45$, respectively.

When gray scale modification is effected, the greater is the $\gamma$ value, the stronger becomes contrast, and the smaller is the $\gamma$ value, the weaker becomes contrast.

The first to third switches 24b-24d and the first to third gray scale modification circuits 24e-24g together constitute the gray scale modification circuit 24, and the first to third switches 24b-24d are designed such that they are controlled by the central calculation processing portion 10 and any gray scale modification characteristic is selected.

The image of the object to be photographed is formed on a light metering member 21 through the condensing lens 12. The light metering member 21 is comprised of five light metering elements 21a-21e to light-meter the object to be photographed in five divisions. The outputs of the light metering elements are amplified by amplifiers 22a-22e, respectively, and logarithmically compressed, and are converted into digital signals by A/D converters 23a-23e and input to the central calculation processing portion 10.

The operation of the electronic still camera constructed as described above will first be described with respect to a case where the difference in quantity of light between portions of the object to be photographed is great.

When the release switch 18 is depressed lightly by the user and the contacts 17a and 17b are closed, the central calculation processing portion 10 examines the output values of the light metering elements 21a-21e converted through the amplifiers 22a-22e and the A/D converters 23a-23e, and if the difference between the greatest output and the smallest output among them, i.e., the difference in quantity of light, is greater than the maximum value prestored in the central calculation processing portion 10, it is judged that the difference in quantity of light between the portions of the object to be photographed is great, and the switch 24d is closed and the other switches 24b and 24c are opened so that the gray scale modifying process may be done by the third gray scale modification circuit 24g having the characteristic of $\gamma 3$ which is smallest in $\gamma$ value.

Also, the central calculation processing portion 10 examines the outputs of the light metering elements 21a-21e converted through the amplifiers 22a-22e and the A/D converters 23a-23e, and determines the size of the aperture diameter of the stop member 2 and the charge accumulation time of the image pickup element 3 so that proper charge accumulation in the image pickup element 3 may be effected.

When the release button 18 is then depressed deeply and the contacts 17b and 17c are closed, the photographing operation is entered. Thereupon, the light passed through the optical lens 1 passes through the stop member 2 which has assumed a predetermined aperture diameter, and is imaged on the image pickup element 3. Charge accumulation in the image pickup element 3 is then effected for the charge accumulation time determined in the central calculation processing portion 10. The charge accumulated in the image pickup element 3 passes as an image signal through the sample hold circuit 5, is subjected to predetermined amplification by the amplifier circuit 6, and is contour-enhanced by the contour enhancement circuit 7. Then it passes through the switch 24d and has its gray scale modified by the characteristic of $\gamma 3$ which is smallest in $\gamma$ value in FIG. 6. Thereby, the image signal in which the gray scale expression for an object to be photographed having a great difference in quantity of light, i.e., so-called high contrast, has become impossible is corrected with a result that moderate contrast is provided and therefore, it never happens that the image becomes unnatural. Then, the white clip level and the set up level are adjusted in the level adjustment circuit 8, and the image signal is recorded on a recording medium in the recording portion 9.

Description will now be made of the operation when the difference in quantity of light between the portions of the object to be photographed is of a medium degree.

When the release switch 18 is depressed by the user and the contacts 17a and 17b are closed, the central calculation processing portion 10 examines the output values of the light metering elements 21a-21e converted through the amplifiers 22a-22e and the A/D converters 23a-23e. If the difference between the greatest output and the smallest output among them is between the maximum value and the minimum value prestored in the central calculation processing portion 10, it is judged that the difference in quantity of light between the portions of the object to be photographed is of a medium degree, and the switch 24c is closed and the other switches 24b and 24d are opened so that gray scale modification may be done in the second gray scale modification circuit 24f having the characteristic of $\gamma 2$ which is medium in $\gamma$ value in FIG. 6. The operation until the image signal is thereafter recorded in the recording portion 9 is as previously described.

The operation when the difference in quantity of light is small is likewise as follows. The central calculation processing portion 10 examines the output values of the light metering elements 21a-21e converted through the amplifiers 22a-22e and the A/D converters 23a-23e, and if the difference between the greatest output and the smallest output among them is smaller than the minimum value prestored in the central calculation processing portion 10, it is judged that the difference in quantity of light between the portions of the object to be photographed is small, and the switch 24b is closed and the other switches 24c and 24d are opened so that gray scale modification may be done in the first gray scale modification circuit 24e having the characteristic of $\gamma 1$ which is greatest in $\gamma$ value in FIG. 6. The operation until the image signal is thereafter recorded in the recording portion 9 is as previously described.

In the case of such an object to be photographed having small difference in quantity of light, gray scale modification by the characteristic which is greatest in $\gamma$ value is effected so that modulation may be visually provided and that finally appropriate contrast may be provided.

Description will now be made of a case where the object to be photographed is dark and the stroboscopic lamp 11 is used.

When the release button 18 is depressed and the contacts 17a and 17b are closed, the central calculation processing portion 10 examines the outputs of the light metering elements 21a-21e converted through the amplifiers 22a-22e and the A/D converters 23a-23e, and if it judges that the outputs are small, that is, the object to be photographed is dark and proper exposure cannot be accomplished unless the stroboscopic lamp 11 is made to emit light, the preparation for the light emission of the stroboscopic lamp, for example, the charging of a capacitor, not shown, is effected. When the release button 18 is then depressed deeply and the contacts 17b and 17c are closed, the photographing operation is performed. In this case, the light emission of the stroboscopic lamp 11 is effected during the charge accumulation in the image pickup element 3. At this time, the central calculation processing portion 10 closes the switch 24d and opens the other switches 24b and 24c so that gray scale modification may be done in the third gray scale modification circuit 24g which is smallest in $\gamma$ value, at the stage whereat the central calculation processing portion 10 has examined the outputs of the light metering elements 21a-21e converted through the amplifiers 22a-22e and the A/D converters 23a-23e. This is because if photographing is effected by the use of the stroboscopic lamp 11 approximate to a point source of light, the contrast of the object to be photographed and the shadow formed in the background thereof will be strong and an image having a great difference in quantity of light will be output and therefore, if the $\gamma$ value in gray scale modification is made small, moderate contrast will finally be provided and a visually good image will be provided. The operation thereafter is as previously described.

The case of the light emission of the stroboscopic lamp has been described with respect to a case where the outputs of all the light metering elements 21a-21e are small, but even when only the output of one of the plurality of light metering elements, for example, the light metering element 21c which is the light metering element for light-metering the central portion, if small, that is, when it is judged that photographing will be effected in a backlight condition in which the background is light and the central object to be photographed is dark, a visually good image can be photographed without the central object to be photographed becoming dark if the stroboscopic lamp 11 is made to emit light to the central object to be photographed (the main object to be photographed). In such case, by the stroboscopic lamp 11 being made to emit light, the difference in quantity of light between the background and the main object to be photographed becomes relatively small and therefore, design is made such that the gray scale modification circuit 24f having a medium degree of $\gamma$ value is selected.

Figure 7:
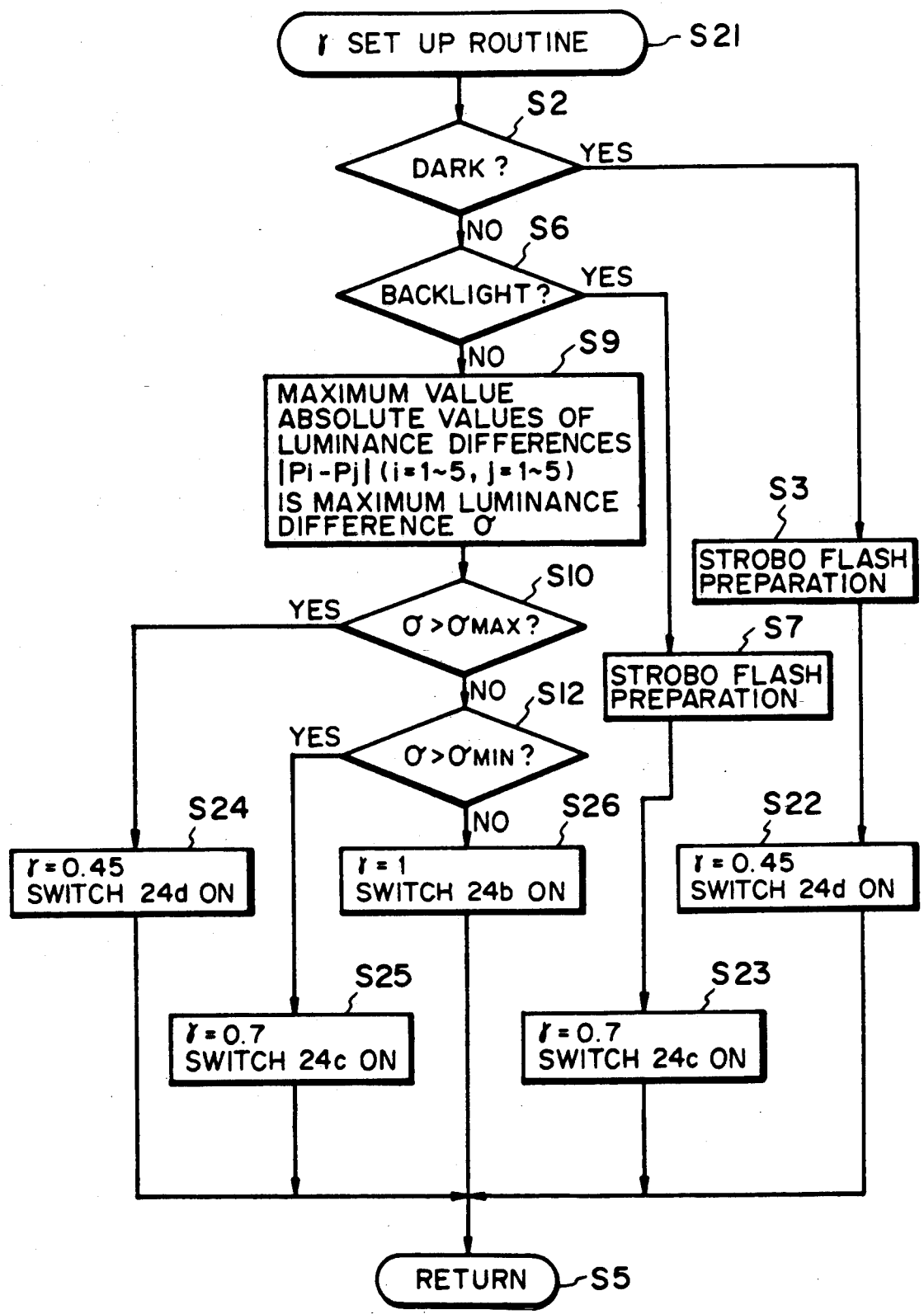
FIG. 7 is a flow chart showing the γ selecting operation based on the result of multimetering in the second embodiment of the present invention.

The setting of $\gamma$ by the aforedescribed central calculation processing portion 10 will hereinafter be described with reference to the flow chart shown in FIG. 7. In FIG. 7, steps given the same symbols as those in FIG. 4 are the same steps as those in FIG. 4.

When the release switch 18 is depressed lightly by the user and the contacts 17a and 17b are closed, the central calculation processing portion 10 starts the γ set up routine at a step 21 (S21).

At a step 2 (S2), whether the object field is dark is judged on the basis of whether the weighted mean value and the normal mean value of the outputs $P_1$-$P_5$ of the A/D converters 22a-22e are lower than a predetermined value. If it is judged that the object field is dark, at a step 3 (S3), the light emission of the stroboscopic lamp is prepared, and at a step 22 (S22), the switch 24d is closed and the third gray scale modification circuit 24g in which γ=0.45 is selected, and at a step 5(S5), return is made.

If at the step 2, it is judged that the object field is not dark, at a step 6 (S6), whether the light is backlight is judged. The judgment as to whether the light is backlight is done, for example, on the basis of whether the difference between the luminance of the central light metering area 21c and the average luminance of the plurality of marginal light metering areas 21a, 21b, 21d and 21e exceeds a predetermined value. If at the step 6 (S6), it is judged that the light is backlight, at a step 7 (S7), the light emission of the stroboscopic lamp is prepared, and at a step 23 (S23), the switch 24c is closed and the second gray scale modification circuit 24f in which γ=0.7 is selected, and at the step 5 (S5), return is made.

If at the step 6, it is judged that the light is not backlight, at a step 9 (S9), the maximum value of the absolute values of luminance differences $|P_i-P_j|$ (i=1-5, j=1-5) is defined as a maximum luminance difference σ. Subsequently, at a step 10 (S10), the maximum luminance difference σ is compared with the maximum allowable value $\sigma_{MAX}$ of the luminance difference prestored in the central calculation processing portion 10, and if the maximum luminance difference σ is greater than the maximum allowable value $\sigma_{MAX}$ of the luminance difference, at a step 24 (S24), the switch 24d is closed and the third gray scale modification circuit 24g in which γ=0.45 is selected, and at the step 5 (S5), return is made.

If at the step 10 (S10), the maximum luminance difference σ is equal to or less than the maximum allowable value $\sigma_{MAX}$ of the luminance difference, at a step 12 (S12), the maximum luminance difference σ is compared with the minimum allowable value $\sigma_{MIN}$ of the luminance difference prestored in the central calculation processing portion 10. If the maximum luminance distance σ is greater than the minimum allowable value $\sigma_{MIN}$ of the luminance difference, at a step 25 (S25), the switch 24c is closed and the second gray scale modification circuit 24f in which γ=0.7 is selected, and at the step 5 (S5), return is made.

If at the step 12 (S12), the maximum luminance difference σ is equal to or less than the minimum allowable value $\sigma_{MIN}$ of the luminance difference, at a step 26 (S26), the switch 24b is closed and the first gray scale modification circuit in which γ=1 is selected, and at the step 5 (S5), return is made.

In the present embodiment, the change-over system using switches is adopted so that the degree of the gray scale modification characteristic may be stepwisely changed, but alternatively, design may be made such that the degree of the gray scale modification characteristic is continuously changed. Also, as regards the use of the stroboscopic lamp, provision may be made of a selection switch for selecting the presence or absence of light emission not only by the judgment of the central calculation processing portion, but also by the user's judgment, and design may be made such that the gray scale modification characteristic is changed over in response to this switch.

Also, in the present embodiment, the characteristic of gamma correction is used as the gray scale modification means, but alternatively, any modification table may be memorized in a memory and any characteristic may be set and used, such as effecting gray scale modification on the basis of the modification table.

Also, in the present embodiment, selection of the gray scale modification characteristic is effected on the basis of the difference between the maximum value and the minimum value of the output values from the light metering means, whereas the method of calculation is not restricted thereto, but conversion tables corresponding to the output values may be memorized by the central calculation processing portion and selection of the gray scale modification characteristic may be effected on the basis of such conversion tables.

As described above, according to the second embodiment, a plurality of portions of an object to be photographed are light-metered by the light metering means and the gray scale modification characteristic is changed in conformity with the difference in quantity of light, whereby a good image visually free of unnaturalness and having moderate contrast can always be obtained from any object to be photographed. Also, even when the object to be photographed is illuminated by the light emitting means and the difference in quantity of light becomes great, a good image visually free of unnaturalness can be obtained by changing the gray scale modification characteristic to a gray scale modification characteristic for weakening the contrast.

We claim:

1. An electronic still camera including:
light metering means for light-metering a plurality of portions of an object to be photographed and outputting a plurality of signals corresponding to the quantities of light of said portions;
image pickup means for converting the image of the object to be photographed into an image signal;
gray scale modification means provided with a plurality of selectable gray scale modification characteristics and modifying the gray scale of said image signal; and
selecting means for effecting calculation on the basis of the outputs from said light metering means and selecting one of said plurality of gray scale modification characteristics provided in said gray scale modification means on the basis of the result of said calculation.

2. An electronic still camera including:
light metering means for light-metering a plurality of portions of an object to be photographed and outputting a plurality of signals corresponding to the quantities of light of said portions;
light emitting means for illuminating the object to be photographed;
image pickup means for converting the image of the object to be photographed into an image signal;
gray scale modification means provided with a plurality of selectable gray scale modification characteristics and modifying the gray scale of said image signal; and
selecting means for selecting one of said plurality of gray scale modification characteristics provided in said gray scale modification means on the basis of the outputs from said light metering means and the presence or absence of the light emission by said light emitting means during photographing.

* * * * *